United States Patent
Grant et al.

(10) Patent No.: US 11,649,036 B2
(45) Date of Patent: May 16, 2023

(54) PROPELLER PROVIDED WITH INTERCHANGEABLE BLADES AND A METHOD OF MOUNTING INTERCHANGEABLE BLADES ON A PROPELLER

(71) Applicant: AIRBUS HELICOPTERS, Marignane (FR)

(72) Inventors: Scott Grant, Vaires sur Marne (FR); Mathias Fournier, Aix en Provence (FR); Sylvain Berthalon, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 134 days.

(21) Appl. No.: 16/903,794

(22) Filed: Jun. 17, 2020

(65) Prior Publication Data
US 2020/0407045 A1 Dec. 31, 2020

(30) Foreign Application Priority Data

Jun. 27, 2019 (FR) ........................................ 1907049

(51) Int. Cl.
| | | |
|---|---|---|
| *B64C 11/06* | (2006.01) | |
| *B64C 11/00* | (2006.01) | |
| *B64C 11/32* | (2006.01) | |

(52) U.S. Cl.
CPC ............ *B64C 11/06* (2013.01); *B64C 11/008* (2013.01); *B64C 11/32* (2013.01)

(58) Field of Classification Search
CPC ....... B64C 11/008; B64C 11/02; B64C 11/04; B64C 11/065; B64C 11/06; B64C 11/32;
(Continued)

(56) References Cited

U.S. PATENT DOCUMENTS 3,387,664 A * 6/1968 Cummings ............. B64C 11/06
416/157 R
3,810,713 A   5/1974 Joiner
(Continued)

FOREIGN PATENT DOCUMENTS

| CA | 2931923 A1 | 12/2016 |
|---|---|---|
| EP | 1824732 A1 | 8/2007 |

(Continued)

OTHER PUBLICATIONS

French Search Report for French Application No. FR 1907049, Completed by the French Patent Office, dated Feb. 24, 2020, 10 pages.

*Primary Examiner* — Richard A Edgar
(74) *Attorney, Agent, or Firm* — Brooks Kushman P.C.

(57) ABSTRACT

A propeller provided with interchangeable blades, and to a method of mounting such interchangeable blades on the propeller. The propeller comprises a hub, fastening fittings, rotation guide devices for guiding the fastening fittings in rotation relative to the hub, locking parts, and blades. The fastening fittings are configured to be assembled into the hub from the inside of the hub, and the locking parts lock respective ones of the fastening fittings onto the hub. The blades are fastened to respective ones of the fastening fittings outside the hub and can thus easily be replaced with other blades without removing the propeller.

17 Claims, 6 Drawing Sheets

(58) Field of Classification Search
CPC ...... F04D 29/322; F04D 29/323; F04D 29/34; F04D 29/36; F04D 29/362; F01D 7/00
See application file for complete search history.

(56) References Cited

U.S. PATENT DOCUMENTS

| | | |
|---|---|---|
| 5,118,256 A | 6/1992 | Violette et al. |
| 5,163,817 A * | 11/1992 | Violette ................ F01D 5/3053 416/500 |
| 6,443,701 B1 | 9/2002 | Muehlbauer |
| 2008/0279689 A1 | 11/2008 | Sebald |
| 2011/0129345 A1 | 6/2011 | Towkan |
| 2012/0034095 A1 | 2/2012 | Towkan |
| 2012/0099991 A1 | 4/2012 | Muehlbauer |
| 2015/0330233 A1 | 11/2015 | Petellaz et al. |

FOREIGN PATENT DOCUMENTS

| | | |
|---|---|---|
| FR | 2953195 A1 | 6/2011 |
| FR | 3021030 A1 | 11/2015 |
| GB | 2251896 A | 7/1992 |
| WO | 2006063572 A1 | 6/2006 |

* cited by examiner

PROPELLER PROVIDED WITH INTERCHANGEABLE BLADES AND A METHOD OF MOUNTING INTERCHANGEABLE BLADES ON A PROPELLER

CROSS-REFERENCE TO RELATED APPLICATIONS

This application claims priority to French patent application No. FR 19 07049 filed on Jun. 27, 2019, the disclosure of which is incorporated in its entirety by reference herein.

BACKGROUND OF THE INVENTION

(1) Field of the Invention

The present invention lies in the field of aircraft rotors, and in particular in the field of propellers for propelling an aircraft forwards.

(2) Description of Related Art

The present invention relates to a propeller provided with interchangeable blades, and to a method of mounting such interchangeable blades on a propeller.

A propeller conventionally has a rotary hub and a plurality of blades hinged to the hub. The pitch of the blades can generally vary collectively, i.e. identically for all of the blades. A propeller may be a "forward-thrust propeller" or "forward-propulsion propeller".

An aircraft, including a rotorcraft, may have one or more propellers, e.g. placed on either side of the fuselage, and optionally on wings of the aircraft. A propeller may have at least two blades mounted in the hub, the number of blades depending, in particular, on the forward thrust force that is to be generated.

Furthermore, and in widely used prior art, for each blade, a propeller has at least one ball bearing arranged between the hub and the root or "shank" of the blade in order to guide the blade as it moves in rotation about its pitch axis. A single, angular contact ball bearing may be used for each blade, as described in Document US 2012/0099991, for supporting the forces generated while the blades are moving in rotation about their pitch axes.

In that document US 2012/0099991, each blade of the propeller is fastened to a support. The support is positioned in the hub of the rotor. The angular contact ball bearing is positioned between the hub and the support and provides an axial abutment for the support-and-blade assembly on the hub along the pitch axis of the blade and in the direction going towards the outside of the hub.

Stop means, e.g. a resilient ring, are inserted between the hub and the support in order to provide an axial abutment along the pitch axis of the blade and in the direction going towards the inside of the hub so as to hold the blade in position when the propeller is not turning, in particular so as to retain the blade under the effect of its weight.

Such a propeller can be complex to assemble. Firstly, each blade has to be fastened to the support that extends substantially parallel to the pitch axis of the blade. Then the inner ring of the ball bearing and an O-ring seal are positioned on the support, the inner ring being in two pieces so that it can be placed on the support radially, since axial mounting is impossible.

The resulting assembly can then be inserted into the hub from outside the hub. The balls of the ball bearing are then put in place one-by-one on the inner ring inside the hub, which is the step that is the most constraining. The resulting assembly is then moved in the direction going towards the outside of the hub in order to put the balls into contact with the outer ring of the ball bearing, which outer ring was pre-assembled on the hub. Finally, the stop means are put in place between the support and the hub.

These operations have to be repeated for each blade of the propeller.

Therefore, when a blade needs to be removed, e.g. for being repaired or replaced, a reverse process that is equally complex and constraining has to be performed. Furthermore, such removal and re-mounting of the blades has to be performed by skilled staff, which constitutes an additional constraint.

Thus, when a blade is damaged, the repair or replacement operation then requires specific expertise and possibly cannot be performed by the user of the aircraft. The propeller as a whole has to be handed over to skilled staff, which leads to lengthy and penalizing grounding of the aircraft.

Furthermore, a propeller can include a pitch variation system for varying the pitch of each blade, which system is provided with a pitch control system internal to the hub. For example, Document US 2012/0099991 describes a hydraulic pitch variation system. When the blades are being mounted, that pitch control system internal to the hub has to be moved in order to enable the support-and-blade assemblies to be inserted into the hub.

In addition, Document FR 3 021 030 describes a blade anchored securely in a propeller hub. The blade has a blade root or "blade shank" provided with a constriction in order to hold the blade root in the hub radially. The blade root also has an anchoring bushing for assembling the blade root to the hub. The anchoring bushing has anchoring means for assembling the blade root to the hub and fastening means for fastening the blade to the blade root.

Document EP 1 824 732 is also known that describes a propeller having two angular contact ball bearings arranged between each blade and the hub of the rotor. Each blade of that propeller can be moved along its longitudinal axis.

The prior part also includes Document CA 2 931 923 that describes a propeller that does not have a ball bearing between the hub and each blade, but rather a ring provided with a projecting or convex shape that co-operates with a recessed or concave shape in order to lock the blade longitudinally against the hub. That ring guides the blade as it moves in rotation about its pitch axis.

In addition, the technological background of the invention includes Document U.S. Pat. No. 6,443,701 that describes a blade root made of a plastics material, as well as Documents FR 2 953 195, US 2012/0034095, U.S. Pat. Nos. 5,118,256, 3,810,713, and GB 2 251 896.

BRIEF SUMMARY OF THE INVENTION

An object of the present invention is to provide a propeller for an aircraft that makes it possible to overcome the limitations indicated above by making it simpler for its blades to be mounted and removed.

To this end, the present invention provides a propeller of an aircraft, which propeller is provided with interchangeable blades. The propeller comprises:
 a hub;
 at least two blades;
 one fastening fitting per blade;

one rotation guide device per blade, each of the guide devices being arranged between the hub and a respective fastening fitting; and first fastening devices for fastening said at least two blades, and interconnecting each of said at least two blades and a respective one of the fastening fittings so as to secure each blade to a fastening fitting and so as to couple each blade to the hub via a respective fastening fitting.

The propeller of the invention is remarkable in that the first fastening devices are arranged outside the hub of the propeller.

Each fastening fitting or "ferrule" is assembled to the hub from the inside of the hub. This mounting of each fastening fitting from the inside of the hub is made possible, unlike in the usual prior art described, for example, in Document US 2012/0099991, by the fact that the fastening fitting is assembled to the hub independently from the blade, the blade not yet being fastened to the fastening fitting while this mounting is being performed.

Each rotation guide device is arranged inside the hub, between the hub and the respective fastening fitting that is associated with said guide device, in order to guide the respective fastening fitting in rotation relative to the hub about an axis of rotation. Each guide device thus makes it possible to guide the respective blade in rotation relative to the hub about a pitch axis of the blade. The pitch axis of each blade also corresponds to a radial direction for the hub driving the blades in rotation.

The guide device also axially locks the fastening fitting into the hub in the direction going towards the outside of the hub along the axis of rotation of the guide device.

As a result of this mounting of each fastening fitting, each blade is fastened to a fastening fitting by means of the first fastening devices outside the hub, unlike in the usual prior art, described, for example, in Document US 2012/0099991. In this way, the fastening fitting is inserted from the inside of the hub prior to assembling the blade, which is then secured to the fastening fitting from the outside of the hub. The fastening fitting can thus be inserted directly with the balls and the inner ring of the guide device into the hub.

For example, the root of a blade may be arranged between two cheek plates of a fastening fitting. The first fastening devices then pass through the two cheek plates of the fastening fitting so as to clamp the two cheek plates against the blade, thereby securing the blade to the fastening fitting. The blade is then also secured to the hub via the fastening fitting.

For example, the first fastening devices may comprise bolts and nuts, each bolt passing through respective holes in the cheek plates of a fastening fitting and in the blade, a nut making it possible to lock the bolt onto the assembly formed by a fastening fitting and by a blade. The first fastening devices may also comprise pins arranged in such holes through a fastening fitting and through a blade, as well as locking devices, such as split pins, for example.

At least two first fastening devices may be used per blade in order to secure the blade effectively to the fastening fitting and, thereby in order to couple the blade to the hub. Preferably, four fastening devices may be used per blade in order to oppose the stresses generated by the aerodynamic forces while the hub is rotating. A higher number of fastening devices may also be used per blade.

The first fastening devices are preferably arranged along a direction perpendicular to a plane containing the longitudinal axis of the blade.

In order to remove a blade from the propeller for repair or replacement purposes, it then suffices to release the blade from the fastening fitting by removing the first fastening devices that are advantageously readily accessible from the outside of the hub. The blade is thus simple and quick to remove. Similarly, with the invention, these elements are simple and quick to re-assemble.

In addition, with the invention, no specific skill is required for performing such a blade replacement, unlike with prior art propellers. Therefore, the time for which the aircraft is grounded for the purpose of replacing a blade on a propeller of the invention may advantageously be reduced to the time required for removing a blade and for mounting a new or repaired one.

For example, each guide device comprises at least one ball bearing, and therefore comprises at least one inner ring, at least one outer ring, and rolling elements. The inner ring of each guide device is secured to or integral with a respective fastening fitting, and the outer ring is secured to or integral with the hub.

Thus, the outer ring of each guide device may be integrated into the hub, and/or the inner ring of each guide device may be integrated into a fastening fitting.

Alternatively, the outer ring of each guide device may be a part that is independent from the hub. The outer ring may be assembled into the hub prior to inserting each of the fastening fittings into the hub, or indeed the outer ring may be assembled onto a fastening fitting. Similarly, the inner ring of each guide device may be a part that is independent from a fastening fitting. The inner ring may be assembled onto a fastening fitting prior to inserting that fastening fitting into the hub.

In order to facilitate mounting them, the rolling elements of each of the guide devices may also be pre-assembled onto the inner ring or indeed into the outer ring of the guide device.

In addition, by virtue of each fastening fitting being mounted from the inside of the hub, the inner ring of each guide device is advantageously made in one piece. The prior art of the invention conventionally uses an inner ring in two pieces so as to enable it to be mounted on the support, before the resulting assembly is inserted into the hub from the outside of the hub as shown in Document US 2012/0099991. Under those conditions, it is not possible to mount the inner ring on the support axially, it being necessary for the two pieces of the inner ring of each guide device to be assembled radially onto the support.

Using an inner ring in two pieces can, in particular, cause premature wear on the balls and possibly on the inner ring.

Advantageously, the use of a one-piece inner ring limits or indeed removes the risks of such premature wear appearing and increases accordingly the life span of each guide device of the propeller of the invention.

Each guide device may comprise a single ball bearing, e.g. an angular contact ball bearing.

The propeller of the invention may further have one or more of the following characteristics, taken individually or in combination.

In one aspect, the propeller may further comprise one locking part per blade, each locking part being designed to provide an axial abutment along the pitch axis of the respective blade and going towards the inside of the hub so as to lock a respective fastening fitting radially onto the hub. Each locking part is arranged outside the hub. The function of this locking part is to lock the fastening fitting radially and in the direction going towards the inside of the hub. This function is necessary only when the propeller is stationary, i.e. when it is not turning. Indeed, while the hub is rotating, the centrifugal force moves each of the assemblies formed by a respective blade and by a respective fastening fitting radially towards the outside of the hub.

The locking part may comprise a resilient ring, e.g. a "circlip". Such a resilient ring may be inserted into a groove in the hub and co-operate with a shoulder on the fastening fitting. Such a resilient ring may also be inserted into a groove in the fastening fitting and co-operate with the outside wall of the hub.

The locking part may also have a member making it possible to support, if necessary, at least one balancing weight designed to balance the assembly made up of a fastening fitting, of the locking part, and of a blade, firstly about the pitch axis of the blade and secondly about the axis of rotation of the hub.

Each balancing weight can be arranged on a fastening fitting rather than on the locking part in order to balance the assembly made up of a fastening fitting and of a blade.

For example, each fastening fitting or indeed each locking part is provided with at least one rod configured to receive at least one balancing weight formed by a washer. Each washer can then be held in position on the rod, e.g. by means of a nut.

The propeller may further comprise second fastening devices, each interconnecting a respective locking part and a respective fastening fitting in order to secure the locking part to the fastening fitting.

For example, the second fastening devices may comprise screws, each screw being arranged through a through hole in a locking part and into a tapped hole in a fastening fitting. The second fastening devices may also comprise pins arranged through holes in a fastening fitting and in a locking part, and locking devices, such as split-pins, for example, making it possible to lock the respective pins onto the assembly made up of a fastening fitting and of a locking part. The second fastening devices may also comprise bolts and nuts.

In one aspect, each fastening fitting of the propeller of the invention may include a pitch control finger, and said propeller then includes a blade pitch control device arranged inside said hub. The blade pitch control device then co-operates with the pitch control finger of each fastening fitting in order to change the pitch of each blade.

In another aspect, the propeller of the invention may further comprise one pitch lever per blade and a blade pitch control device, each pitch lever being connected to a respective locking part and the pitch control device being arranged outside the hub. The blade pitch control device then co-operates with the pitch levers in order to change the pitch of each blade.

In addition, the propeller of the invention may further comprise at least one sealing device, e.g. an O-ring seal, in known manner and similar to the prior art. For example, the sealing device is arranged between the fastening fitting and the hub, and positioned, along the radial direction of the hub, between the guide device and an outside wall of the hub.

The present invention also provides a method of assembling a propeller of an aircraft, which propeller is provided with interchangeable blades and comprises:
 a hub;
 at least two blades;
 one fastening fitting per blade; and
 one rotation guide device per blade.

This method of assembling a propeller comprises the following steps that are performed sequentially:
 inserting each fastening fitting into the hub from the inside of the hub;
 mounting said at least two blades into respective ones of the fastening fittings outside the hub; and
 securing the blades to the respective ones of the fastening fittings.

In this method, assembling a propeller is simplified and quick. Indeed, each fastening fitting is firstly inserted into an orifice in the hub prior to mounting the blades. Consequently, the insertion can be performed from the inside of the hub. Then, the blades are assembled to the respective fastening fittings outside the hub. Finally, each blade is secured to a fastening fitting, e.g. by means of first fastening devices.

In addition, the method of the invention may further comprise a step of positioning a respective guide device between each of the fastening fittings and the hub. This positioning of a respective guide device between each of the fastening fittings and the hub may be performed substantially simultaneously with the insertion of each fastening fitting. This positioning of the guide device may also be performed prior to insertion of the fastening fitting and optionally be broken down into sub-steps.

For example, with each of the guide devices comprising an inner ring, an outer ring, and rolling elements, the step of positioning a guide device may comprise the following three sub-steps:
 assembling the outer ring of each of the guide devices into the hub;
 assembling the inner ring of each of the guide devices onto a respective one of the fastening fittings; and
 assembling the rolling elements of each guide device onto the inner ring or indeed into the outer ring of the guide device.

In this way, all of the rolling elements are advantageously assembled onto the inner ring or indeed into the outer ring of the guide device simultaneously, e.g. by being held together by a cage, unlike in the prior art in which the rolling elements are put in place one-by-one.

In addition, the method of the invention may further comprise a step of mounting a locking part onto each fastening fitting outside the hub so as to lock the fastening fitting radially onto the hub in the direction going towards the inside of the hub.

In addition, the method of the invention may further comprise an additional step of securing each of the locking parts onto the respective one of the fastening fittings, e.g. by means of second fastening devices.

Furthermore, the method of the invention may further include an additional step of fastening at least one balancing weight to at least one of the fastening fittings and/or, when the propeller has locking parts, to at least one of the locking parts. A balancing weight may be designed to balance the assembly made up of a fastening fitting, of a blade, and optionally of a locking part, firstly about the pitch axis of the blade and secondly about the axis of rotation of the hub.

The propeller of the invention thus proposes a novel architecture that can be implemented industrially and that makes it possible to remove, re-mount and/or replace a blade in an operation that is simple, quick, and inexpensive, and that does not require any particular expertise. Furthermore, the propeller of the invention can also make it possible to improve the longevity of its guide devices.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
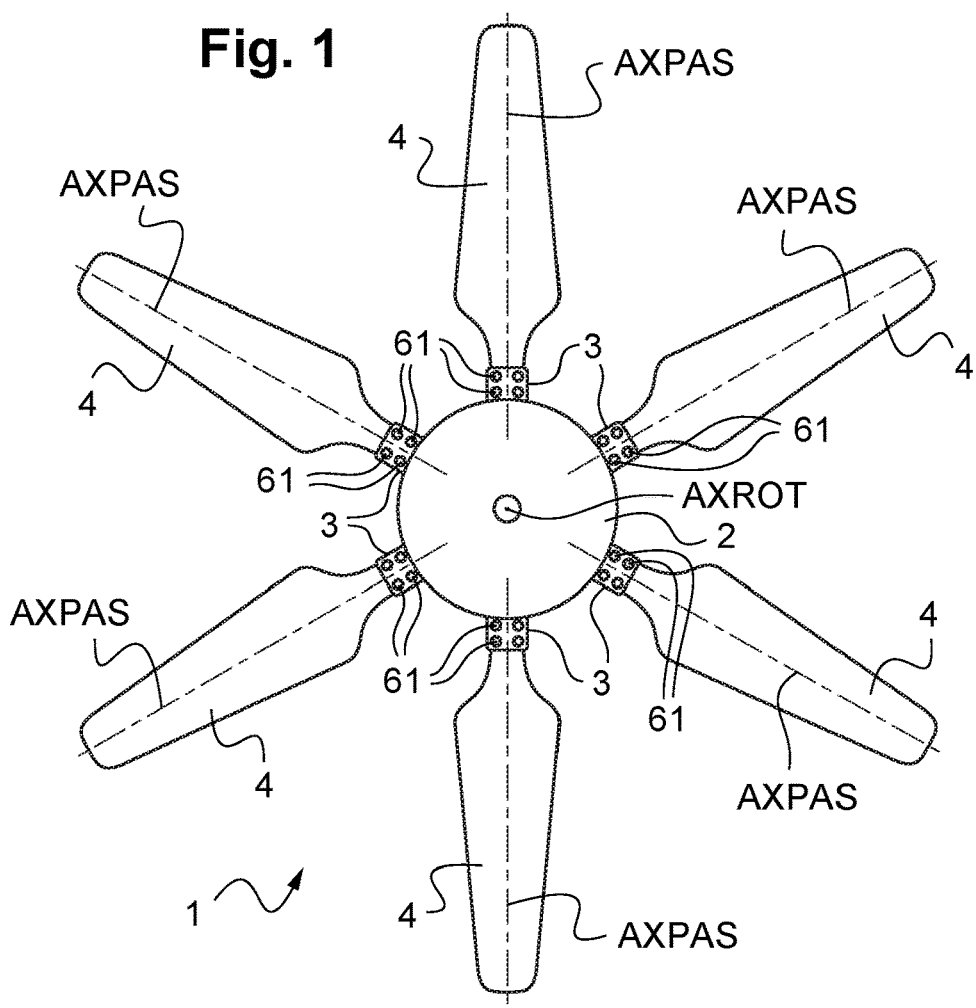
FIG. 1 shows a propeller of an aircraft.

The propeller 1 shown in FIG. 1 is designed to provide forward propulsion for an aircraft, which may be a fixed-wing or a rotary-wing aircraft. This propeller has a hub carrying at least two blades 4. The example of the propeller 1 shown in FIG. 1 has six blades 4, although a different number of blades 4 may be used without calling into question implementation of the invention.

The propeller 1 also has one fastening fitting or "ferrule" 3 per blade 4, each fastening fitting 3 connecting a respective blade 4 to the hub 2. First fastening devices 61 secure each blade 4 to a respective fastening fitting 3. In this manner, the blades 4 are secured to the hub 2 by respective ones of the fastening fittings 3 and are driven by the hub 2 in rotation about the axis of rotation AXROT of the propeller 1 in order to generate an aerodynamic force for propelling the aircraft forwards.

Each blade 4 can also turn about its pitch axis AXPAS in order to change its pitch. This pitch axis AXPAS corresponds to the longitudinal axis of the blade 4 and extends in a direction that is radial for the hub 2. For example, the fastening fitting 3 has a portion that is circularly symmetrical about the pitch axis AXPAS at the connection with the hub 2 and two cheek plates at the connection with the blade 4.

Figure 2:
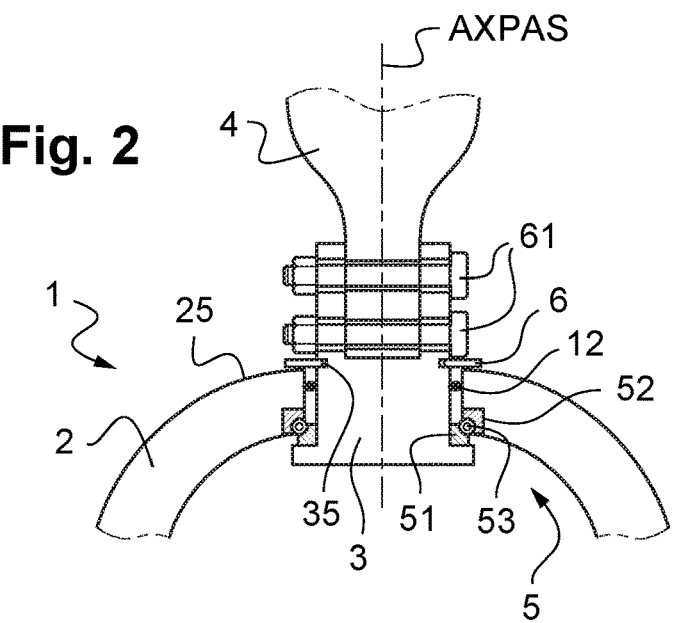
FIG. 2 is a section view of the propeller.

In order to allow the blade to move in rotation about its pitch axis AXPAS, the propeller 1 has one guide device 5 per blade 4, each guide device 5 being arranged between the hub 2 and the respective fastening fitting 3 as shown in FIG. 2. For example, the guide device 5 has a single, angular contact ball bearing comprising an inner ring 51, an outer ring 52, and rolling elements 53, namely balls in the example shown. The inner ring 51 is secured to the fastening fitting 3 and the outer ring 52 is secured to the hub 2. In this way, for each blade 4, a guide device 5 provides an axial abutment for a fastening fitting 3 radially relative to the hub 2, namely along the pitch axis AXPAS of the blade 4, and in the direction going towards the outside of the hub 2.

The inner ring 51 may also be an integral part of the fastening fitting 3 and the outer ring 52 may be an integral part of the hub 2.

The inner ring 51 is formed in one piece and can thus be assembled axially onto the fastening fitting 3.

The propeller 1 further includes a sealing device 12, e.g. an O-ring seal, arranged between the fastening fitting 3 and the hub 2.

The propeller 1 may also include one locking part 6 per blade 4, which locking part 6 is arranged outside the hub 2. The locking part 6 may be arranged in a groove 35 in the fastening fitting 3 and bear against the outer wall 25 of the hub 2 in order to provide an axial abutment for the fastening fitting 3 radially relative to the hub 2, namely along the pitch axis AXPAS of the blade 4, and in the direction going towards the inside of the hub 2.

While the propeller 1 is rotating, the centrifugal force that is generated moves the blades 4 and the fastening fittings 3 radially in the direction going towards the outside of the hub 2, the blades 4 and the fastening fittings 3 then being retained relative to the hub 2 by the guide device 5. Clearance is then present between the locking part 6 and the hub 2.

In the absence of the locking part 6, the axial abutment function for each fastening fitting 3 radially relative to the hub 2 in the direction going towards the inside of the hub 2 may also be provided by the blade 4 secured to the fastening fitting 3 or indeed optionally by the first fastening devices 61.

For example, the locking part 6 may comprise a resilient ring, as shown in FIG. 2.

Figure 4:
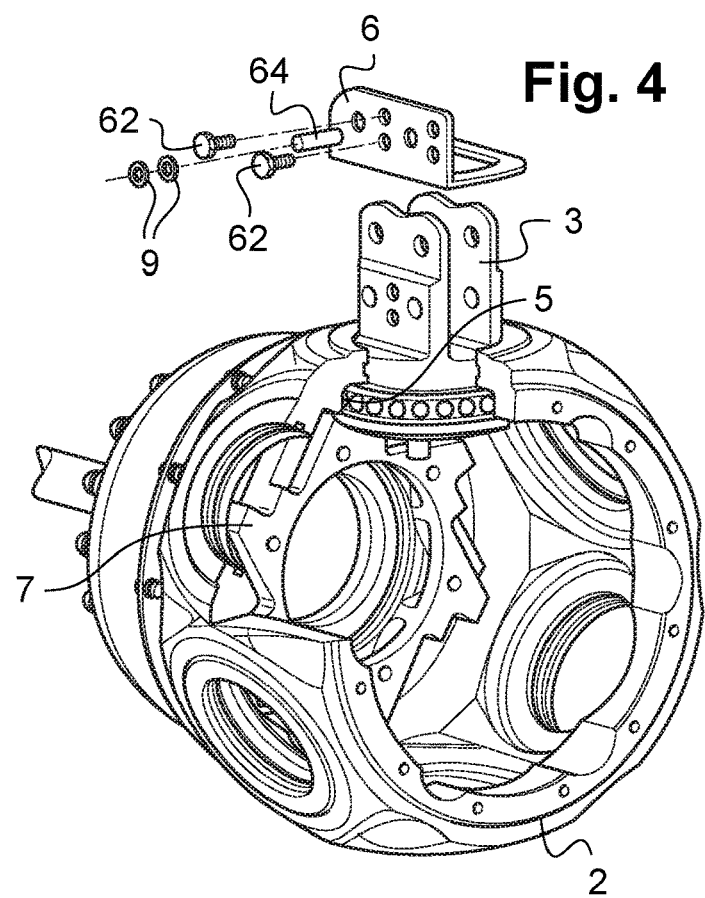
Figure 5:
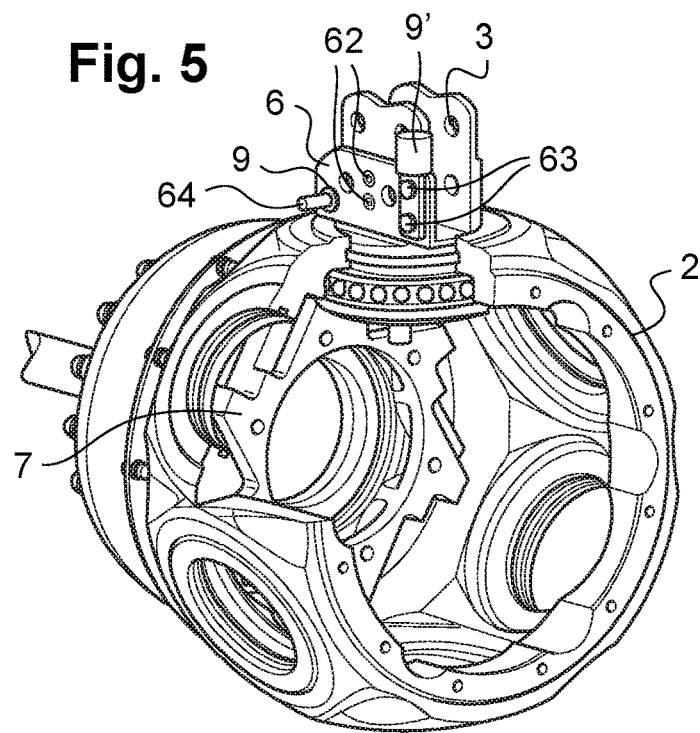

The locking part 6 may take other forms, as shown in FIGS. 4 and 5.

The locking part 6 may be fastened to the fastening fitting 3 by second fastening devices 62, e.g. two screws passing through holes in the locking part 6 and screwing into tapped holes in the fastening fitting 3.

For example, the locking part 6 may be formed by two plates. A first plate is provided with a hole enabling the fastening fitting 3 to pass through it, this first plate bearing against the hub 2 in order to provide the axial abutment for the fastening fitting 3 radially relative to the hub 2. A second plate is provided with holes making it possible firstly for the first fastening devices 61 to pass through it and secondly for the second fastening devices 62 to pass through it.

The locking part 6 may also carry balancing weights 9, 9'. For example, the locking part 6 may include a rod 64 on which one or more first balancing weights 9 in the form of washers are positioned. The locking part 6 may also carry a second balancing weight 9' fastened by third fastening devices 63, e.g. screws or bolts.

The first balancing weights 9 are designed to balance the assembly formed by the fastening fitting 3, by the blade 4, and by the locking part 6 about the axis of rotation AXROT of the hub 2. A second balancing weight 9' is designed to balance this assembly about the pitch axis AXPAS of the blade 4.

The balancing weights may, if need be, also be arranged in similar manner on each of the fastening fittings 3, rather than on the locking part 6.

Balancing weights may also, if need be, be arranged in similar manner on each of the fastening fittings 3, in addition to the balancing weights 9 arranged on the locking parts 6.

In order to change the pitch of the blades 4, the propeller 1 may include a pitch control system.

This pitch control system may be internal to the hub 2 of the propeller 1, as shown in FIGS. 3 to 9. For example, said pitch control system may include a pitch control device 7 arranged inside the hub 2 and co-operating with a pitch control finger 31 on each fastening fitting 3. The pitch control device 7 moving along the axis of rotation AXROT of the hub 2 makes it possible to move the pitch control fingers 31 in order to cause the blades 4 to move in rotation about their respective pitch axes AXPAS.

Figure 10:
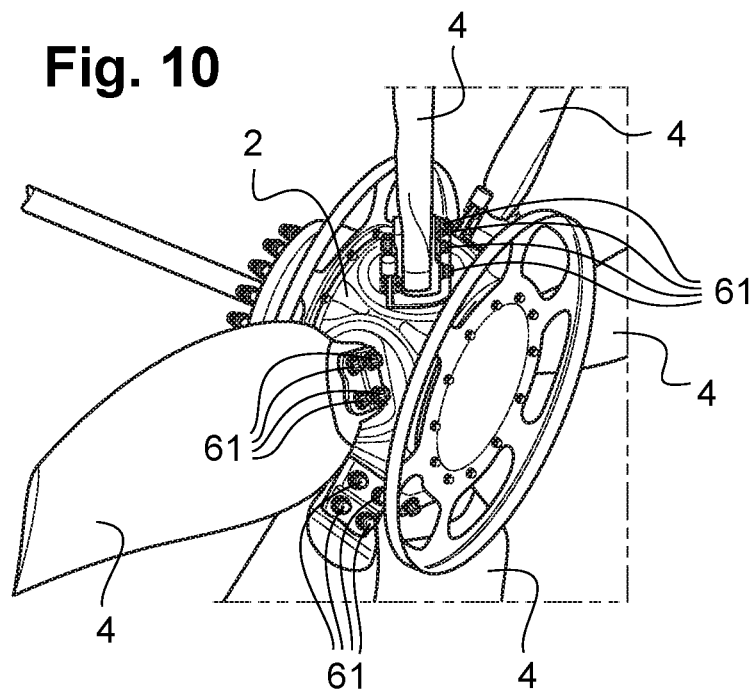
Figure 11:
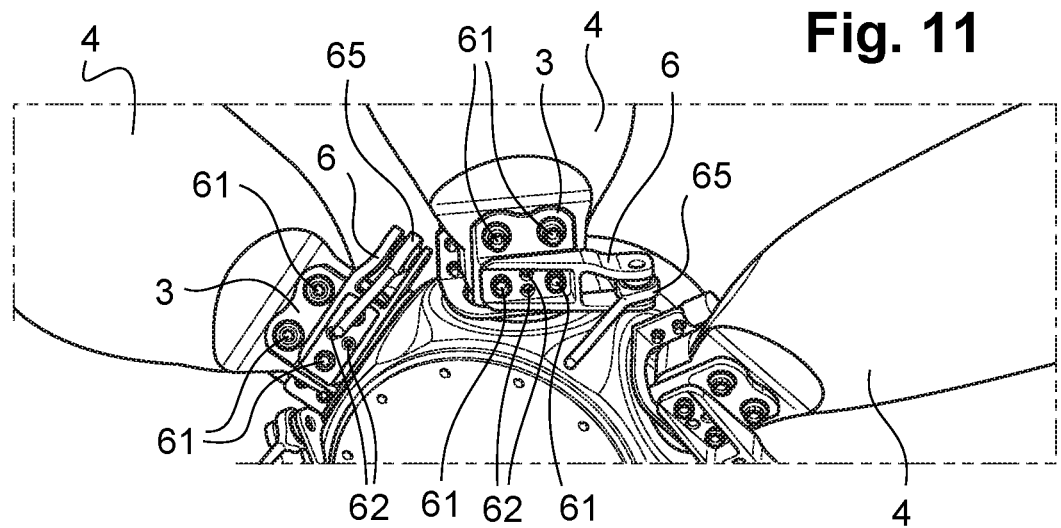
FIG. 11 is a fragmentary view of a propeller.

Alternatively, said pitch control system, which is shown in fragmentary manner in FIG. 11, may be external to the hub 2 of the propeller 1. For example, said pitch control system may include one pitch lever 65 per blade 4 and a pitch control device arranged outside the hub 2 and not shown in FIG. 11. Each pitch lever 65 is coupled to a respective locking part 6, e.g. via a ball joint, and the pitch control device 8 co-operates with the pitch levers 65 in order to cause the blades 4 to move in rotation about their respective pitch axes AXPAS. In at least certain embodiments, as shown in at least FIGS. 1, 2 and 9-11, the first fastening devices 61 are arranged in a direction different of the direction of a chord of the blade, regardless of the chord along the blade.

Figure 12:
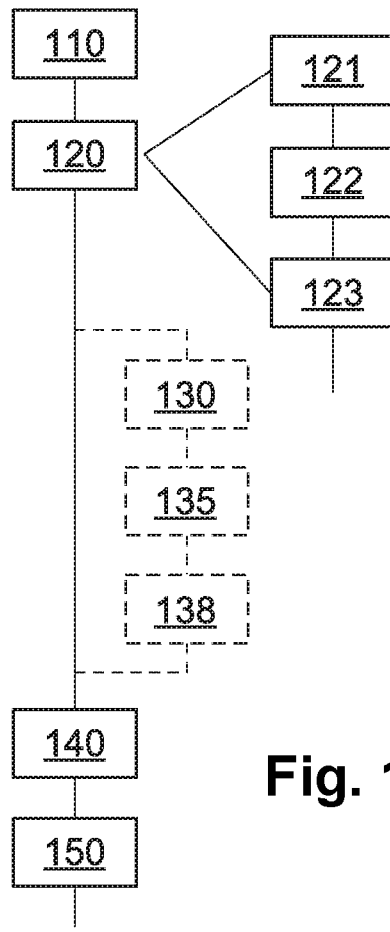
FIG. 12 is a flowchart of a method of assembling the propeller.

This propeller advantageously makes it possible to simplify the method of assembling a propeller 1 of an aircraft with interchangeable blades 4, a flowchart of which is shown in FIG. 12.

This method of assembling a propeller comprises the following steps, which are described with reference to FIGS. 3 to 10.

Figure 3:
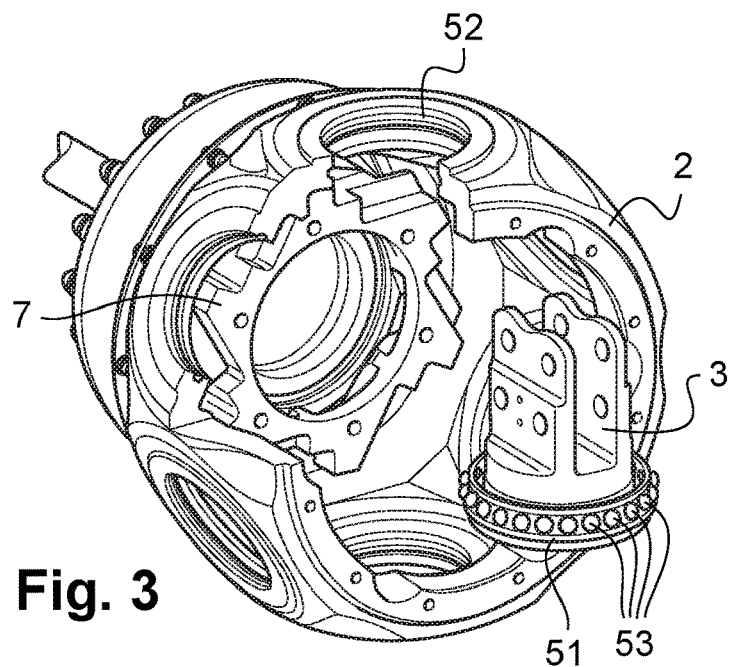
FIGS. 3 to 10 show the various steps of assembling a propeller.

Each fastening fitting 6 is inserted 110 into the hub 2 from the inside of the hub 2 as shown in FIG. 3. Prior to performing this insertion 110, the pitch control device 7 arranged inside the hub 2 is moved along the axis of rotation AXROT of the hub 2 in order to make this insertion of each fastening fitting 6 possible.

Optionally, each guide device 5 may be positioned 120 between the respective one of the fastening fittings 3 and the hub 2. This positioning 120 of each guide device 5 may, for example, be broken down into sub-steps as follows.

The outer ring 52 is assembled 121 into the hub 2, and an inner ring 51 is assembled 122 onto the respective one of the fastening fittings. In addition, the rolling elements 53 of a guide device 5 are also assembled 123 onto the inner ring 51 or indeed into the outer ring 52 of the guide device. In this way, all of the rolling elements 53, e.g. held together by a cage, are advantageously assembled onto the inner ring 51 or indeed into the outer ring 52 of the guide device 5 simultaneously.

In addition, the positioning 120 of each guide device 5 may, alternatively, be performed on the fastening fitting 3 or indeed on the hub 2 prior to inserting 110 each fastening fitting 6 into the hub 2.

In addition, the assembly method may optionally include a step of mounting 130 a respective locking part 6 onto each of the fastening fittings 3 outside the hub 2.

In addition, the method may also include an additional step of securing 135 each locking part 6 onto the respective one of the fastening fittings 3, e.g. by second fixing devices 62.

Figure 6:
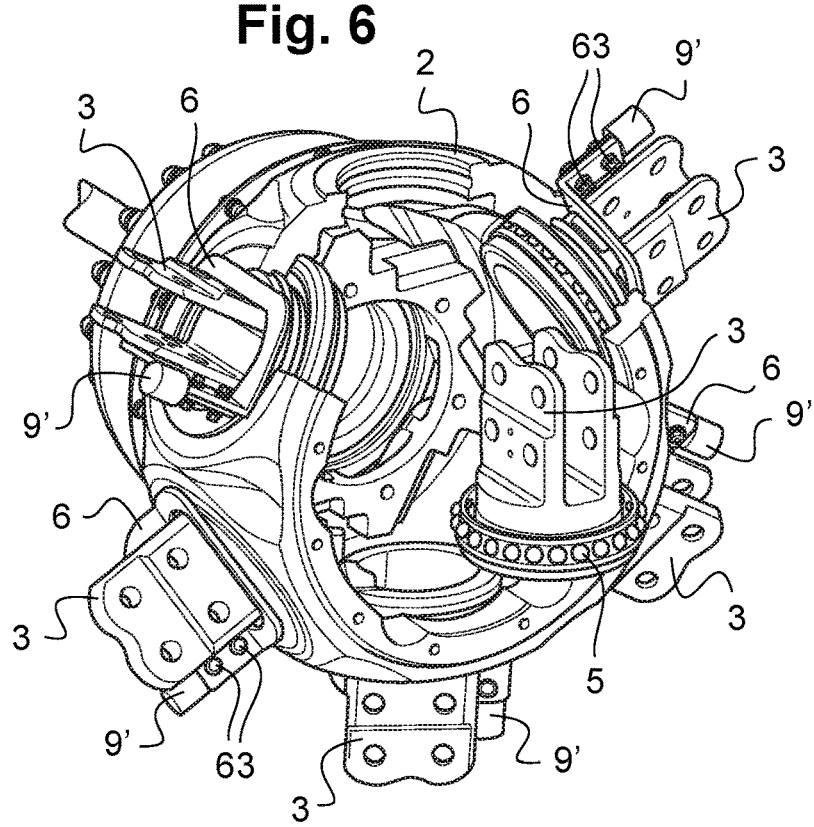
Figure 7:
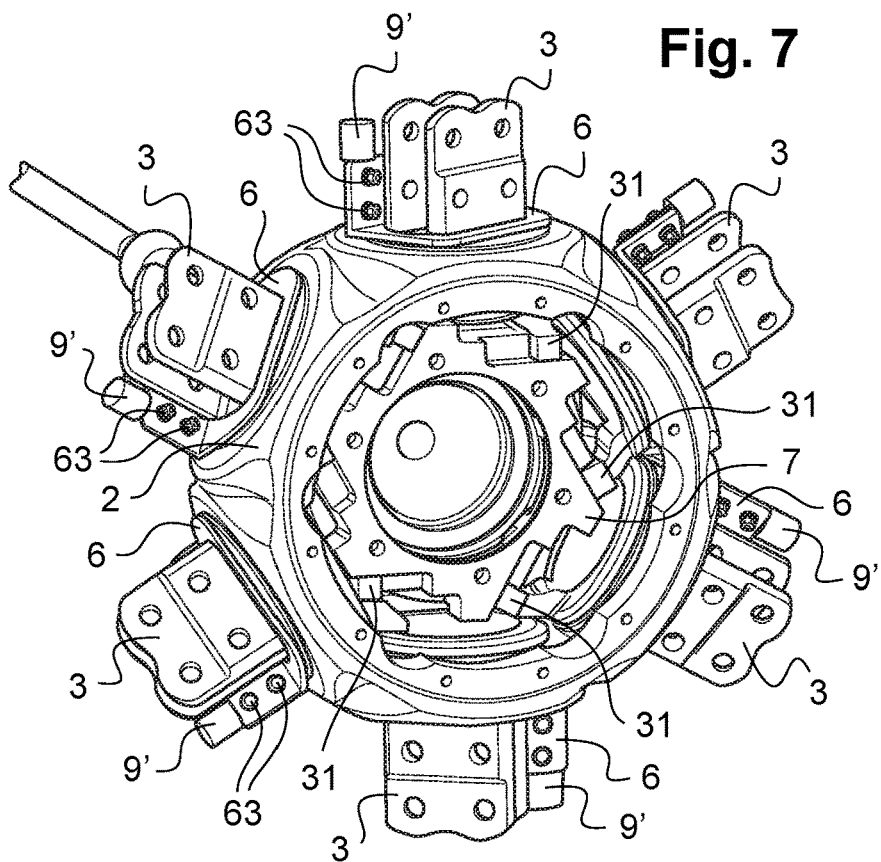

The fastening fittings 3 may thus be assembled one-after-another into the hub 2 of the propeller 1 as shown in FIG. 6.

once all of the fastening fittings 3 are in place in the hub 2, the pitch control device 7, when it is arranged inside the hub 2, is moved along the axis of rotation AXROT of the hub 2 and put in place as shown in FIG. 7 so that the pitch control finger 31 of each fastening fitting 3 can be driven by the pitch control device 7.

Figure 8:
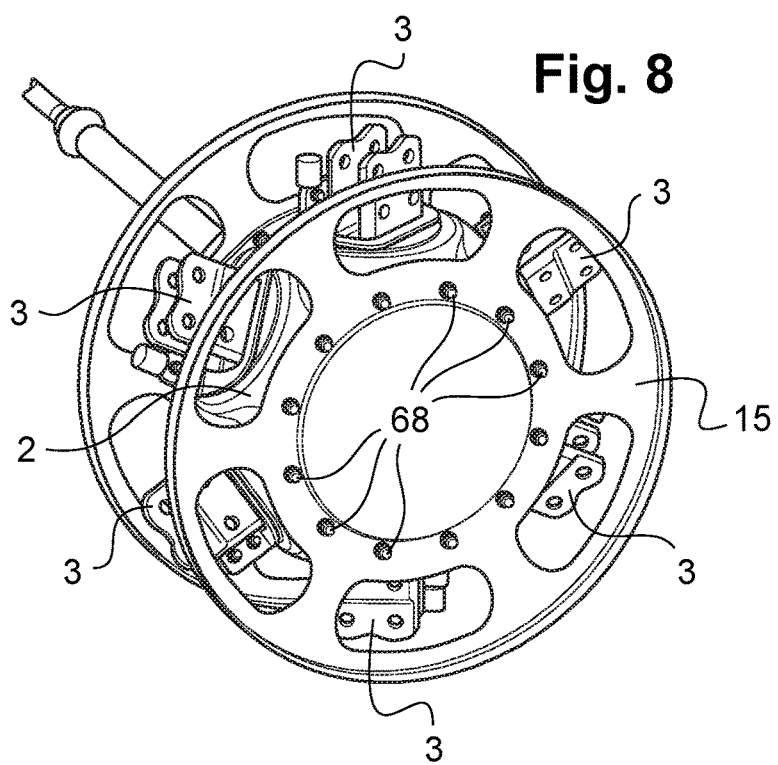

Then, as shown in FIG. 8, the hub 2 is optionally closed by means of a cover 15 secured to the hub 2 via a plurality of fourth fastening devices, e.g. screws or bolts.

Figure 9:
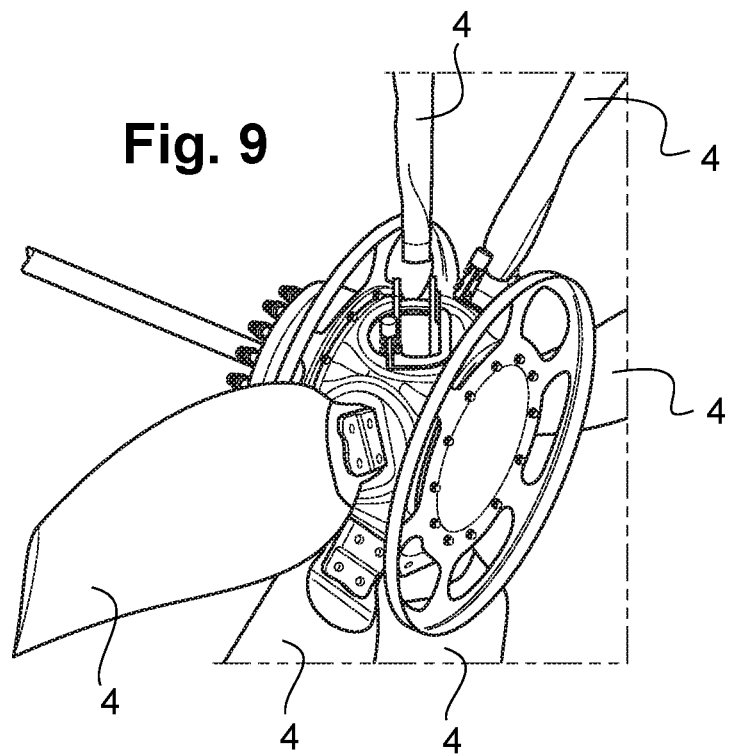

The blades 4 are then mounted 140 into fastening fittings 3 outside the hub 2 as shown in FIG. 9. For example, the end of the blade 4 is inserted between two cheek plates of the fastening fitting 3.

The blades 4 are then secured 150 to the respective fastening fittings 3 as shown in FIG. 10. Four first fastening devices 61, each of which comprises a bolt and a nut, are used in this example for fastening the blade 4 to the fastening fitting 3.

The method of assembling a propeller 1 of an aircraft with interchangeable blades 4 thus advantageously makes it possible to simplify assembly of a propeller 1. Similarly, removing the blades 4 and replacing a single blade 4 can be performed simply and quickly, advantageously without lengthy grounding of the aircraft.

In the method described with reference to FIGS. 3 to 10, all of the fastening fittings 3 are assembled into the hub 2 before the blades 4 are secured to the respective fastening fittings 3. However, it is possible to secure each blade 4 to a respective fastening fitting as the fastening fittings 3 are being inserted into the hub 2.

The method of the invention may further include an additional step of fastening 138 at least one balancing weight onto at least one of the fastening fittings 3 and/or optionally onto at least one of the locking parts 6.

Naturally, the present invention may be subjected to numerous variations as to its implementation. Although several embodiments and implementations are described above, it should readily be understood that it is not conceivable to identify exhaustively all possible embodiments and implementations. It is naturally possible to envisage replacing any of the means described by equivalent means without going beyond the ambit of the present invention.

What is claimed is:

1. A propeller of an aircraft, which propeller is provided with interchangeable blades and comprises:
   a hub;
   at least two blades;
   one fastening fitting per blade;
   one rotation guide device per blade, each of the rotation guide devices being arranged between the hub and a respective fastening fitting; and
   first fastening devices for fastening the at least two blades, and interconnecting each of the at least two blades and a respective one of the fastening fittings so as to secure each blade to a fastening fitting and so as to couple each blade to the hub via a respective fastening fitting;
   wherein the first fastening devices are arranged outside the hub and in a direction different of the direction of a chord of the blade;
   wherein each fastening fitting includes at least one rod configured to receive at least one balancing weight designed to balance an assembly made up of a fastening fitting and of a blade firstly about the pitch axis of the blade and secondly about the axis of rotation of the hub.

2. The propeller according to claim 1,
   wherein each rotation guide device comprises an inner ring, an outer ring, and rolling elements, the inner ring being secured to or integral with a respective one of the fastening fittings and the outer ring being secured to or integral with the hub.

3. The propeller according to claim 2,
   wherein the inner ring is made in one piece.

4. The propeller according to claim 1,
   wherein the propeller further comprises one locking part per blade, each locking part being arranged outside the hub and providing an axial abutment along the pitch axis of the respective blade and going towards the inside of the hub so as to lock a respective fastening fitting radially onto the hub in the direction going towards the inside of the hub.

5. The propeller according to claim 4,
   wherein the propeller further comprises second fastening devices, each of the second fastening devices interconnecting the locking part and the fastening fitting in order to secure the locking part to the fastening fitting.

6. The propeller according to claim 4, wherein each locking part includes at least one rod configured to receive at least one balancing weight.

7. The propeller according to claim 1, wherein each fastening fitting includes a pitch control finger and the propeller includes a pitch control device arranged inside the hub and co-operating with the pitch control finger of each of the fastening fittings in order to change the pitch of each blade.

8. The propeller according to claim 1, wherein the propeller further comprises one pitch lever per blade, each pitch lever being connected to a respective locking part, and the propeller further comprises a pitch control device arranged outside the hub and co-operating with the pitch levers in order to change the pitch of each blade.

9. A propeller of an aircraft,
which propeller is provided with interchangeable blades and comprises:
a hub;
at least two blades;
one fastening fitting per blade;
one rotation guide device per blade, each of the rotation guide devices being arranged between the hub and a respective fastening fitting; and
first fastening devices for fastening the at least two blades, and interconnecting each of the at least two blades and a respective one of the fastening fittings so as to secure each blade to a fastening fitting and so as to couple each blade to the hub via a respective fastening fitting;
wherein the first fastening devices are arranged outside the hub,
wherein each fastening fitting includes a pitch control finger and the propeller includes a pitch control device arranged inside the hub and co-operating with the pitch control finger of each of the fastening fittings in order to change the pitch of each blade.

10. The propeller according to claim 9, wherein each rotation guide device comprises an inner ring, an outer ring, and rolling elements, the inner ring being secured to or integral with a respective one of the fastening fittings and the outer ring being secured to or integral with the hub, and wherein the inner ring is made in one piece.

11. A propeller of an aircraft
which propeller is provided with interchangeable blades and comprises:
a hub;
at least two blades;
one fastening fitting per blade;
one rotation guide device per blade, each of the rotation guide devices being arranged between the hub and a respective fastening fitting; and
first fastening devices for fastening the at least two blades, and interconnecting each of the at least two blades and a respective one of the fastening fittings so as to secure each blade to a fastening fitting and so as to couple each blade to the hub via a respective fastening fitting;
wherein the first fastening devices are arranged outside the hub,
wherein the propeller further comprises one locking part per blade, each locking part being arranged outside the hub and providing an axial abutment along the pitch axis of the respective blade and going towards the inside of the hub so as to lock a respective fastening fitting radially onto the hub in the direction going towards the inside of the hub,
wherein the propeller further comprises one pitch lever per blade, each pitch lever being connected to a respective locking part, and the propeller further comprises a pitch control device arranged outside the hub and co-operating with the pitch levers in order to change the pitch of each blade.

12. The propeller according to claim 11, wherein each rotation guide device comprises an inner ring, an outer ring, and rolling elements, the inner ring being secured to or integral with a respective one of the fastening fittings and the outer ring being secured to or integral with the hub, and wherein the inner ring is made in one piece.

13. A method of assembling the propeller of an aircraft, which propeller is provided with interchangeable blades and comprises:
a hub;
at least two blades;
one fastening fitting per blade; and
one rotation guide device per blade;
wherein the method comprises the following steps:
inserting each fastening fitting into the hub from the inside of the hub;
mounting the at least two blades into respective ones of the fastening fittings outside the hub; and
securing the blades to the respective ones of the fastening fittings with first fastening devices arranged outside the hub and in a direction different of the direction of a chord of the blade, regardless of the chord along the blade;
wherein the method further comprises an additional step of fastening at least one balancing weight to at least one of the fastening fittings and/or, when the propeller has locking parts, to at least one of the locking parts.

14. The method according to claim 13,
wherein the method further comprises a step of positioning a respective rotation guide device between each of the fastening fittings and the hub.

15. The method according to claim 14,
wherein, with each of the rotation guide devices comprising an inner ring, an outer ring and rolling elements, the step of positioning a rotation guide device comprises the following three sub-steps:
assembling the outer ring of each of the rotation guide devices into the hub;
assembling the inner ring of each of the rotation guide devices onto a respective one of the fastening fittings; and
assembling the rolling elements of each rotation guide device onto the inner ring or indeed into the outer ring of the rotation guide device.

16. The method according to claim 13, wherein the method further comprises a step of mounting each of the locking parts onto the respective ones of the fastening fittings outside the hub so as to lock the fastening fittings radially onto the hub in the direction going towards the inside of the hub.

17. The method according to claim 16, wherein the method further comprises an additional step of securing each of the locking parts on the respective ones of the fastening fittings.

* * * * *